United States Patent [19]

Hoppenstein

[11] Patent Number: 5,049,987
[45] Date of Patent: Sep. 17, 1991

[54] METHOD AND APPARATUS FOR CREATING THREE-DIMENSIONAL TELEVISION OR OTHER MULTI-DIMENSIONAL IMAGES

[76] Inventor: Reuben Hoppenstein, 303 Second Ave., New York, N.Y. 10003

[21] Appl. No.: 420,158

[22] Filed: Oct. 11, 1989

[51] Int. Cl.$^5$ .......................................... H04N 13/00
[52] U.S. Cl. ..................................... 358/88; 358/91; 358/92; 354/115; 359/458; 359/462; 359/463
[58] Field of Search ........................ 358/88, 89, 91, 92; 350/130, 132, 128; 354/112, 113, 115

[56] References Cited

U.S. PATENT DOCUMENTS

| | | | |
|---|---|---|---|
| 3,852,524 | 12/1974 | Ando et al. | 358/91 |
| 3,932,699 | 1/1976 | Tripp | 358/91 |
| 4,190,856 | 2/1980 | Ricks | 358/88 |
| 4,305,095 | 12/1981 | Dallas | 358/3 |
| 4,541,007 | 9/1985 | Nagata | 358/3 |
| 4,571,616 | 2/1986 | Haisma | 358/88 |
| 4,583,117 | 4/1986 | Lipton et al. | 358/3 |
| 4,584,604 | 4/1986 | Guichard | 358/92 |
| 4,651,201 | 3/1987 | Schoolman | 358/98 |
| 4,729,017 | 3/1988 | Sayamaji et al. | 358/88 |
| 4,737,840 | 4/1988 | Morishita | 358/3 |
| 4,897,024 | 2/1989 | McLaurin et al. | 358/88 |

*Primary Examiner*—John K. Peng
*Attorney, Agent, or Firm*—Lieberman Rudolph & Nowak

[57] ABSTRACT

A method and apparatus for the creation of multi-dimensional images are provided. A plurality of image capture devices are arranged in a predetermined pattern about a target image. A lenticular device divides the target image into a plurality of separate and equally sized strip images with the device being located between the target image and the image capture devices. A screening device may be further located between the lenticular device and the image capture devices to create a composite image for storage and/or transmission over standard transmission and display equipment.

10 Claims, 6 Drawing Sheets

METHOD AND APPARATUS FOR CREATING THREE-DIMENSIONAL TELEVISION OR OTHER MULTI-DIMENSIONAL IMAGES

FIELD OF THE INVENTION

This invention generally relates to a novel technique for creating three-dimensional/four-dimensional images and, more particularly, to method and apparatus for dividing a visual image into a plurality of separate image strips, each of which presents the visual image from a different viewing angle, transmitting the plurality of separate strip images as a composite image, and thereafter recreating the visual image in a multi-dimensional format through use of a lenticular lens.

BACKGROUND OF THE INVENTION

The creation and transmission of multi-dimensional images for purposes of enhancing a visual display has been heretofore attempted through use of various techniques and the application of diverse technologies.

For example, in U.S. Pat. No. 4,737,840 to M. Morishita, a three-dimensional image displaying apparatus is described, which apparatus is claimed to be capable of displaying three-dimensional images on a screen. In one preferred embodiment, it is asserted that the image displaying means includes a transmissive diffusion surface onto which images produced by an image generator are projected, a shield plate composed of a plurality of vertically oriented strips disposed on a side of the transmission diffusion surface, such that the images are projected in the form of overlapping, interleaved strips, and a lenticular lens for viewing the image. Although U.S. Pat. No. 4,737,840 alleges creation of three-dimensional images, the apparatus is quite complex, has inherent disadvantages such as the unavailability of color projection tubes (col. 5, lines 52-57), and is believed to create a display with edges that would be substantially blurred.

Similarly, U.S. Pat. No. 4,584,604 to Guichard et al describes method and apparatus for the display of three-dimensional moving pictures. In this reference an image is formed behind a lenticular frame formed by vertical cylindrical lenses with a front convex diopter, the lenses being regularly juxtaposed with a given spacing between lenses. The frame has a focal plane in which is formed the image, the latter being formed by overlapping images comprising horizontal lines of display elements. Although this system appears to generate a multidimensional image, it does so at the expense of complex optics and a large number of cameras, thus giving rise to an expensive and complicated system.

A third system for the generation of multi-dimensional images is described in U.S. Pat. No. 4,541,007 to Nagata. In this system five color television cameras take pictures of an object. Video signals from the central camera and the four adjacent cameras are processed and transmitted via a composite carrier wave to a remote location. At the receiving location the five video signals are reproduced by ensuring that three electron beams, corresponding to the three primary colors, are in synchronization with the five video signals. The five pictures are thus reproduced in stereoscopic relation on the focal plane of a lenticular lens screen. Again, although this system appears to produce multi-dimensional color images, it suffers from the inherent disadvantages of complexity and attendant high cost, stemming from the need to use sophisticated multiplexing and transmission equipment.

Other references which attempt to demonstrate the concept of displaying multi-dimensional images include U.S. Pat. Nos. 4,571,616, 4,807,024, 4,190,856, 4,651,201 and 4,729,017. Each, however, suffers from one or more of the disadvantages discussed above.

The inventor of the instant invention, Dr. Reuben Hoppenstein, is also the inventor of record on U.S. Pat. No. 3,783,282, issued to Dr. Hoppenstein on Jan. 1, 1974 and entitled Stereoscopic Radiography Techniques and Apparatus, the teachings of which are incorporated herein by reference. This patent describes method and apparatus for stereographic radiography wherein a conventional x-ray source is used as a source of radiant energy. A patient is placed upon a moveable x-ray table which is designed to move through an arcuate path to present different positions and angles of the patient to incoming x-ray energy. A film record is disposed beneath the patient, which film record includes a film cassette containing a grid-like arrangement disposed in a position above the film, which grid performs a lenticular lens function for the x-ray source. During exposure, the grid-like arrangement serves to generate a plurality of lineated images on the underlying x-ray film, which images can be viewed to present an illusion of depth and a three-dimensional effect through the use of a conventional lenticular optical screen. In a preferred embodiment of the invention described in U.S. Pat. No. 3,783,282, the lenticular screen contemplated for utilization comprises a series of cylindrical lenses, each 0.4 millimeter wide, and running the length of the film over which it is placed. With a standard 8 inch by 10 inch radiographic film, 500 separate lenticles will be seen to cover the narrow dimension, or 800 separate lenticles could be utilized over a 14 inch by 14 inch plate. In accordance with the optical properties above discussed, and considering the utilization of a 10-exposure film, for example, each lenticle will be seen to reduce the image that strikes it to a narrow strip 0.04 millimeters wide. It is, of course, understood that a larger (or smaller) number of lenticles could be used, for example a 1000 lenticle screen.

It is the object of the instant invention to apply the multi-dimensional techniques described and claimed in the above-identified U.S. Patent, by Dr. Hoppenstein, to other areas such as Fluoroscopy, Computerized Axial Tomographs, Magnetic Resonance Imaging, Television, Movies and the three-dimensional display of other types of visual images.

SUMMARY OF THE INVENTION

In accordance with a first embodiment of the invention, apparatus is provided for creating multi-dimensional images including a plurality of image capture devices arranged in a predetermined pattern about a target image.

It is a feature of the invention that a lenticular device may be located at a first predetermined position between said image capture devices and said target image to divide said target image into a plurality of equally sized strip images, each strip image being comprised of a select view of said target image from a different viewing angle.

It is a further feature of the invention that a screening device may be located between said lenticular device and said image capture devices, the screening device functioning to block a predetermined number of strip images from the image capture devices, and for permitting a predetermined one of strip images to reach said image capture devices.

It is a still further and general feature of the invention that the strip images, after processing by said lenticular device and/or said screening device, can be transmitted as a single composite image over standard video transmission equipment to remote storage or display devices.

The foregoing and other objects and features of this invention will be more fully understood from the following description of an illustrative embodiment thereof taken in conjunction with the accompanying drawings.

DETAILED DESCRIPTION

U.S. Pat. No. 3,783,282 describes a system wherein multiple images formed radiographically about an object can be dissected by sampling predetermined zones of a total image. This is accomplished by positioning a patient upon a movable x-ray table adapted to move through an arcuate path to present different positions and angles of the patient to the incoming ray energy. A film cassette is positioned beneath the patient, and a lenticular grid arrangement is positioned between the patient and the film cassette to dissect the target images in the manner described in U.S. Pat. No. 3,783,282. The dissected images are reformed into a composite picture through use of a lenticular lens. In U.S. Pat. No. 3,783,282, the images are dissected by sampling small zones of a total picture, which zones are 0.4mm apart, and 0.04mm in width. It is to be understood that, if during the creation of multiple images, movement occurs, such as the beating of a heart in a chest x-ray, then on the finished picture, a short time sequence will result. This is, in essence, a fourth dimension—time—as defined by Albert Einstein, during which the heart will beat and the lungs inflate as in real life.

Also discussed in U.S. Pat. No. 3,783,282 is the manner in which stereoscopic images are formed in the prior art with other than radiography techniques. More particularly, referring to FIG. 1 herein, labeled as "Prior Art," there is illustrated a standard commercial camera 10 mounted on a suitable structure (not shown in FIG. 1) for traversing a path about a plurality of target objects 12, 14 and 16. Film 11 is carried at the rear of the camera housing, which film has an overlying lenticular screen 13. Camera 10 is capable of being moved between the illustrated dotted-line positions along an arc whose radii intersect at point 18, which is intended to be the central point of any particular picture to be taken.

Figure 1:
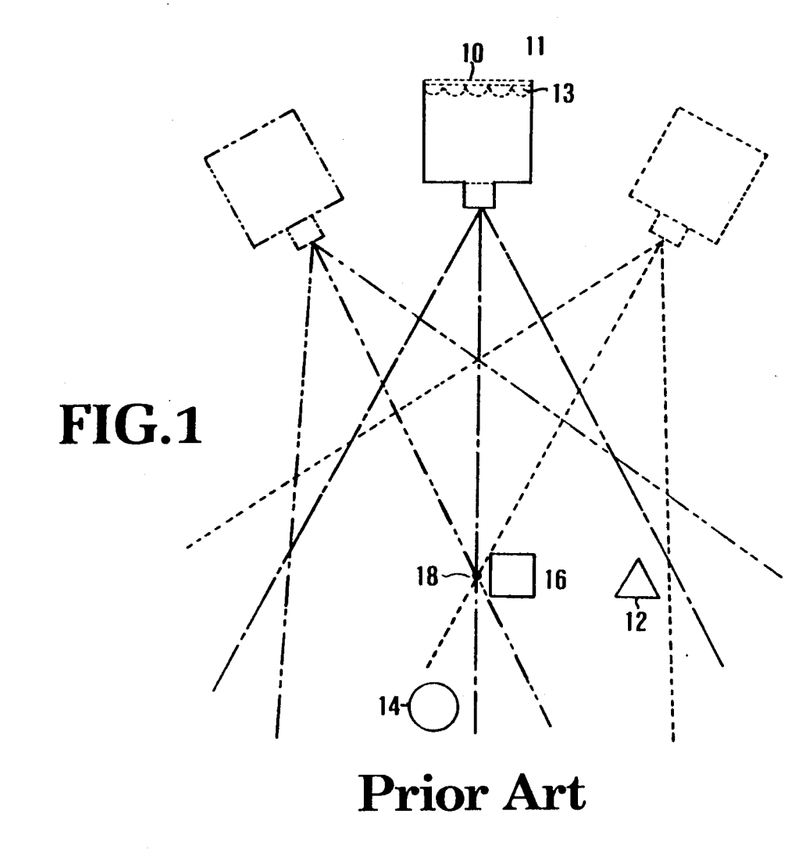
FIG. 1 illustrates prior art technology for the creation of three-dimensional images.

The target object itself is shown as comprising a triangle 12, a circle 14, and a block 16, disposed in different lateral positions relative to the center of the traversing arc upon which the camera 10 will travel and at different distances from the arc path itself. The camera 10 can be assumed to be moveable from an initial position as shown in dotted-lines, on the left, through a central position as shown in solid lines, and to a final position shown in dotted-lines on the right.

The different relative positions of the camera while photographing the object, or the difference in point of view, i.e., parallax of the camera as it traverses its arc, is illustrated by the rays extending from each of the cameras. The relative rays are designated by dotted lines with respect to the left position of the camera, by solid lines with respect to the central position of the camera, and by dash lines with respect to the right position of the camera. It should therefore be noted that with this arrangement, the camera 10 will view the objects 12, 14 and 16 from different points of view as the camera traverses its arcuate path.

As mentioned above, a lineated screen 13 of any suitable form is incorporated in the traversing camera 10 between the camera lens and the film 11, and this lineated screen must be sequentially moved along with movement of the camera 10 between the two end points of its path of travel. By virtue of the refractive and focusing characteristics of the lenticle elements of a conventional lenticular screen, light received by the camera lens and passing to the screen will be focused onto a given vertical line of the film behind each lenticle and, as the screen moves, this vertical line also moves so as to produce the lenticulated image on the film, the developed film being illustrated at 20 in FIG. 2. What will be stored then on the camera film, is a plurality of lenticulated images or strips of the objects 12, 14 and 16, each viewed from a different angle and, thus, containing what can be termed parallax.

Figure 2:
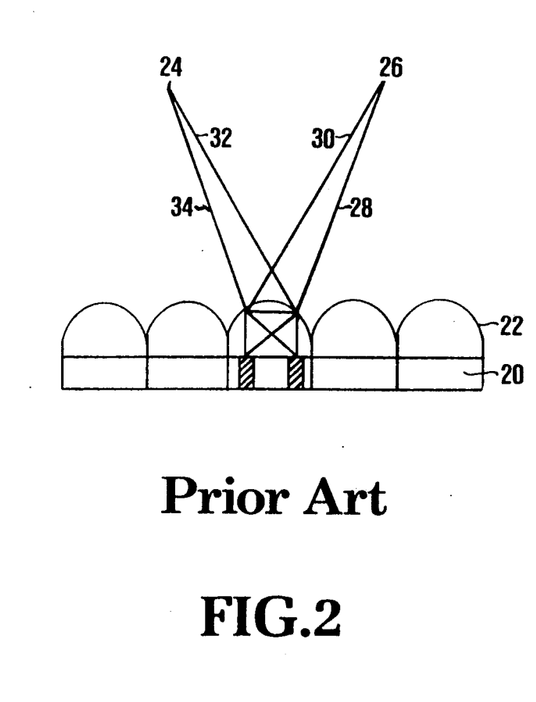
FIG. 2 illustrates the functioning of a lenticular lens and the creation of multi-dimensional images.

The image so produced on the film, though comprising a plurality of individual lines, is continuous within a given film area disposed beneath a single lenticle of the overlying screen, although the point of view from which a given object is seen varies within the panel across the width thereof. Referring now to FIG. 2, a typical conventional lenticulated image as is produced by developing the film is shown and will be seen to comprise the underlying exposed film 20 and a superimposed plurality of lenticles forming a screen 22, similar to screen 13. As stated above, beneath each one of the lenticles of the screen 22, a complete and continuous image of the objects 12, 14 and 16 will be found in a plurality of separate line exposures. When the underlying film or base layer 20 is disposed beneath a lenticular screen 22, with the individual lenticles of the screen being disposed in overlying alignment to the individual panels or strips of the film, then a person viewing the unit will see a three-dimensional picture or, more specifically, a picture creating an illusion of depth.

As shown in FIG. 2, and assuming points 24 and 26 to be the left and right eyes respectively of a viewer, the user's right eye 26 would see rays reflected along the lines 28 and 30 and the user's left eye 24 would receive rays reflected, for example, along the lines 32 and 34. The rays 28 and 30 emanate from, or technically are reflected from a point in one panel or strip of the underlying film which is spaced laterally of a point in the same panel from which rays 32 and 34 are reflected to the user's other eye. The effect is as if the viewer was using a stereoscopic slide disposed within a stereoscope. Separate images of the same picture differing in point of view are received simultaneously by the respective eyes of the viewer, and the viewer's brain will merge such images and create, through sensory perception, the three-dimensional illusion. While the unit of FIG. 2 has been described with respect to what occurs behind a single lenticle of the lenticular screen 22, it should be understood that the viewer would see many lenticles simultaneously by virtue of the relatively small size thereof and, thus, the viewer would receive an overall picture in three-dimensions. The operation with respect to each of the lenticles is the same as that described and, thus, the illusion created by each lenticle need not be discussed in exhaustive detail.

While the above described system produces a simulation of three-dimensional imaging, it does not demonstrate the ability to readily capture, store and transmit three-dimensional images for viewing at a remote location.

Figures 3, 4:
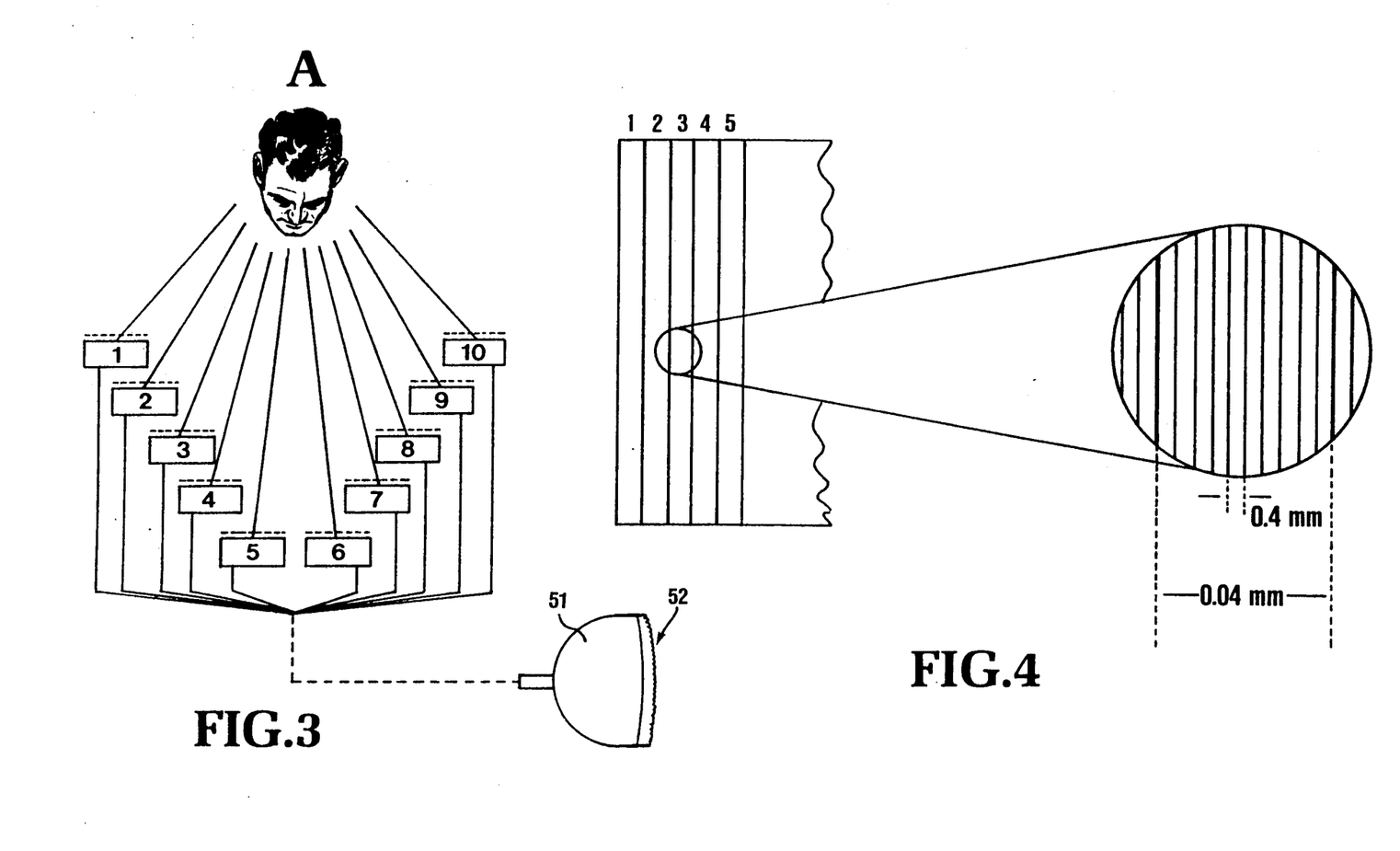
FIG. 3 illustrates a target image surrounded by image capture devices in accordance with the instant invention.
FIG. 4 illustrates the manner in which a target image is divided into a plurality of strip images.

Referring now to FIG. 3, there is illustrated the basic principals of the instant invention. More particularly, if ten separate images are taken about a point A, equally spaced for example at $-7\frac{1}{2}°$ to $+7\frac{1}{2}°$ about a centerline, each picture would show a slight variation in observation of point A. It is to be understood that it is not important for purposes of the instant invention what particular technique or technology would be used to capture and store the various images. For example, the image could be captured by photographic, electronic or radiographic means, and any reference to the term camera hereinafter is understood to encompass any and all known means of image capture. Similarly, storage of the image can be on film, digital memory, or any other known technique. It is also to be understood herein that the number of views of the target image could be more or less than ten. Means for displaying images are described herein. FIG. 3 illustrates an example wherein means are a cathode ray tube (51) with a lenticular device (52) located adjacent to the cathode ray tube.

In accordance with the instant invention, each of the now captured ten views is divided into 1,000 (could be more or less) equal vertical strips with a grid or lenticular lens arrangement, and then each strip can be further subdivided into ten (could be more or less) equal strips in the same manner. The dissection of an image is illustrated in FIG. 4, and by way of example the first division is illustrated as equal to strips of 0.4mm, while the second division is illustrated as equal to strips of 0.04mm. It is to be understood that image dissection, in accordance with FIGS. 3 and 4, is accomplished, for example, by use of a grid or lenticular lens, or both, in front of each camera as illustrated at 15 in FIG. 3, and functioning in the manner described above.

Figure 5:
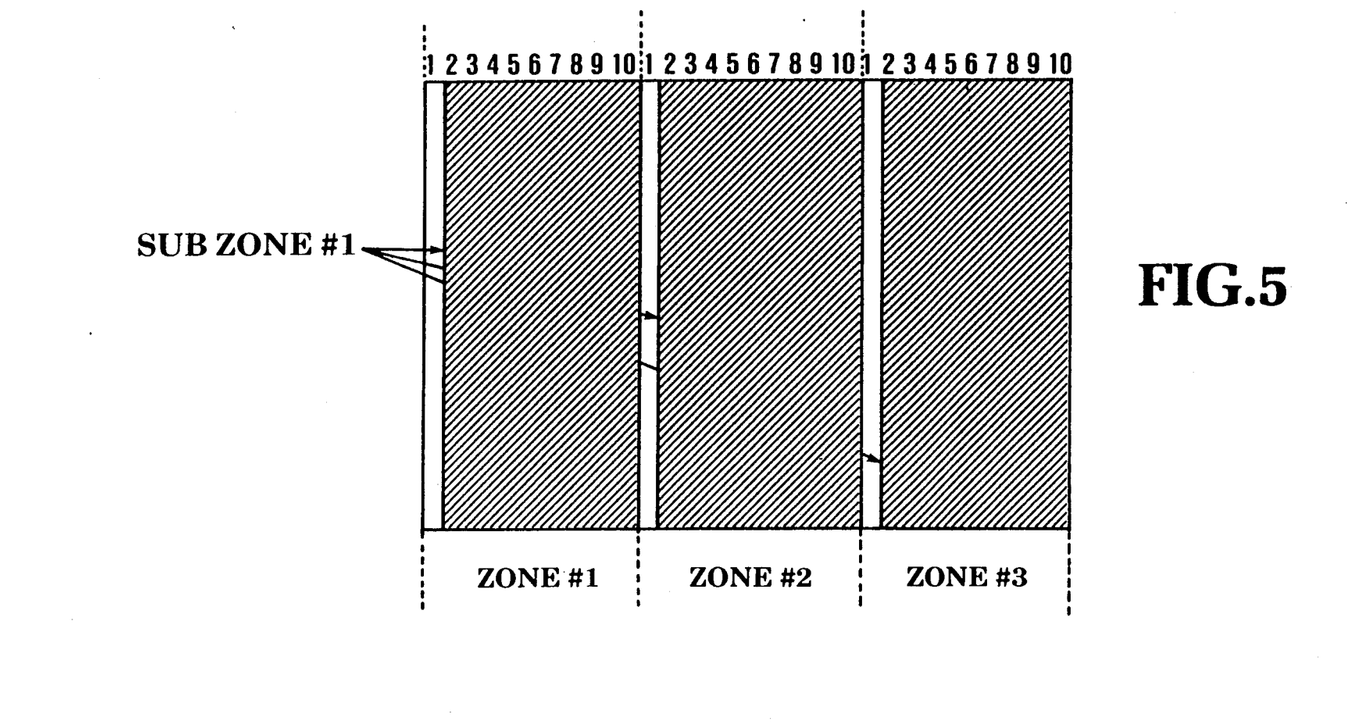
FIG. 5 illustrates a screening means for use with the instant invention.

An example of a grid arrangement for use with the instant invention is shown in FIG. 5. Each grid is designed to shield 90% of each lenticular format for each camera. More particularly, each grid is identified as a separate zone in FIG. 2, with only zones 1-3 illustrated, it being understood that there would be a zone (grid) for each of the ten or more cameras. Also, each grid is divided into 10 sub-zones, as shown in FIG. 2.

Each grid shields nine sub-zones out of the ten sub-zones for each zone to thereby store, record or expose only a single image strip in sub-zone number #1 for camera number #1, expose only a single image strip in sub-zone #2 for camera #2, and expose only a single image strip in sub-zone #3 for camera #3, etc.

As illustrated, each camera is only storing (on film or other suitable storage medium) one-tenth of the captured image behind each zone with each camera storing a predetermined sub-zone. All ten sub-zones are then combined and stored on one piece of film (or other storage medium), in immediately adjacent positions, as a composite image. The stored composite image may then be viewed as a three-dimensional image when viewed through a properly aligned and matching lenticular lens.

The stored image can also be viewed as four-dimensional if the image is moving and the ten zones/sub-zones are recorded sequentially. It should also be understood that if one frame or photographic recording is being stored, a single three-dimensional image results. However, with known electronic scanning means, each frame could have the ten sub-zones recorded sequentially and because of the sequential recording of each zone and sub-zone, a four-dimensional movie, fluoroscopy, CAT scan, magnetic resonance scan, sonogram, etc., can be produced.

Figure 6:
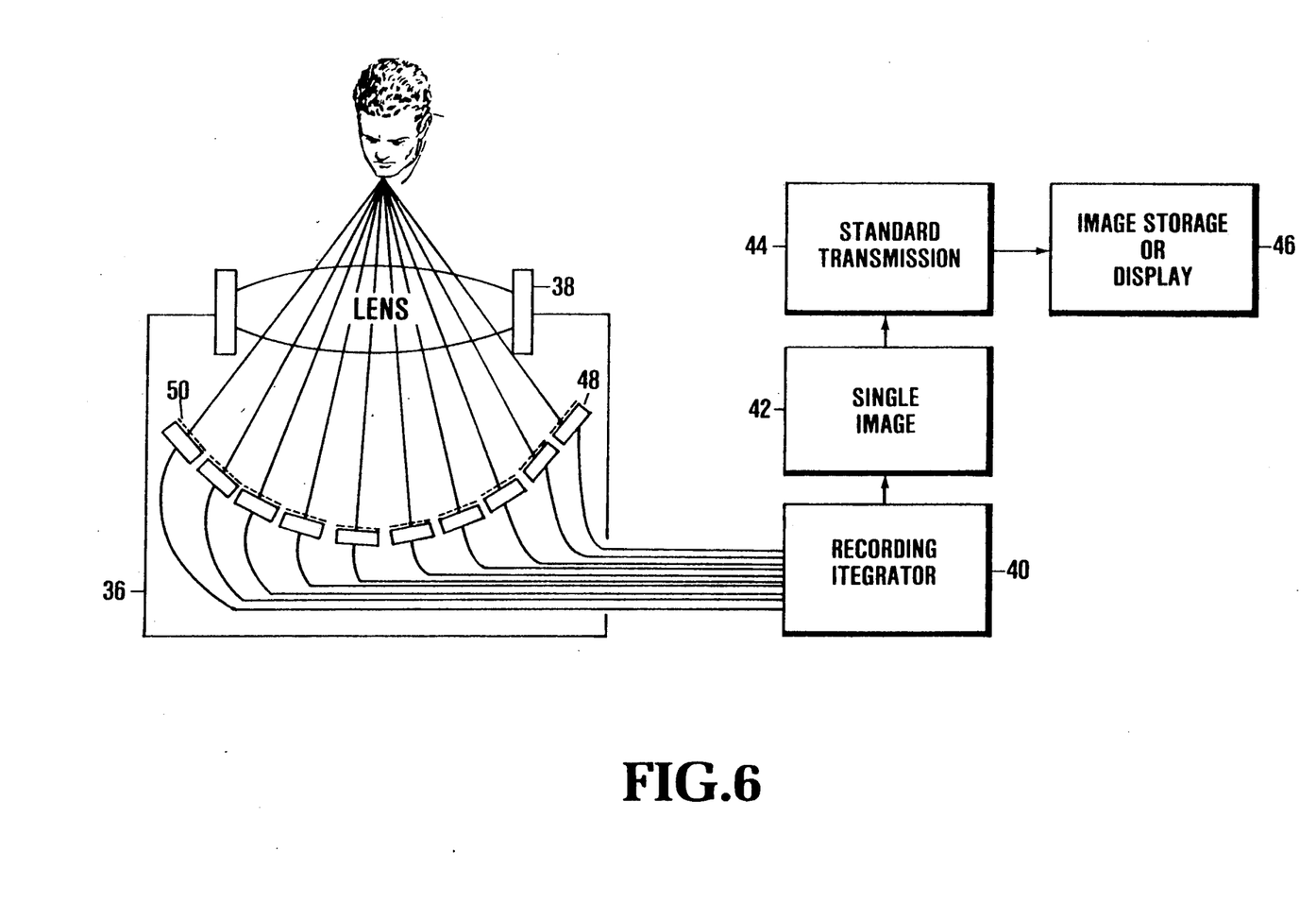
FIG. 6 illustrates a second embodiment of the instant invention wherein a single lens is utilized.

Refer now to FIG. 6, where there is shown an alternative embodiment of the instant invention. More particularly, in FIG. 3, image capture was illustrated through use of ten separate cameras, each including a separate grid or lenticular lens, or both, in front of, and in contact with, the recording medium. The embodiment shown in FIG. 6, however, uses a single camera 36 having a single lens 38 and a plurality of recording devices 48. Recording devices 48 can include electronic image capture devices, (with appropriate grid or lenticular means 50 as described above), such as photo conductors, or other suitable devices, capable of converting visual images into electronic signals. The resultant electronic signals are then integrated into a composite image and recorded, as illustrated at device 40. It is to be understood that device 40 can include any well-known electronic storage medium, along with standard devices for assembling the separate strip images into a composite image. The resultant electronic composite image at 42 can then be transmitted via standard transmission equipment 44 to remote electronic storage or display device 46. As the technologies necessary to accomplish the functions illustrated at devices 40-46 would be well known to those skilled in the art of image capture, storage and transmission, these devices will not be described in further detail herein.

The instant invention can also be used as a real-time image intensifier (fluoroscopy) to obtain three-dimensional x-ray images for catheterization, instant intraoperative localization, and angiography in the medical field. Other uses would be the utilization of three-dimensional x-ray images to view the interior of baggage to enhance airport security and to monitor the interior of motor vehicles at international (or state) borders.

Figure 7:
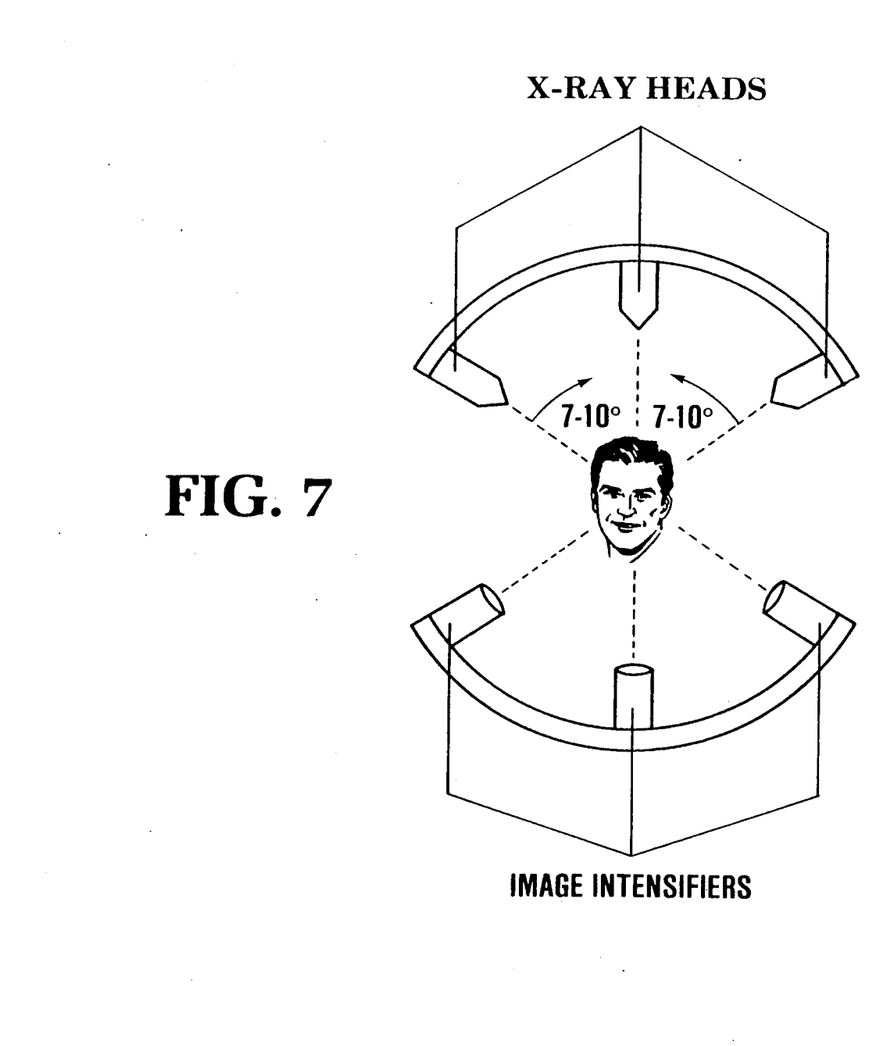
FIGS. 7 and 8 illustrate use of the instant invention with x-ray equipment.
Figure 8:
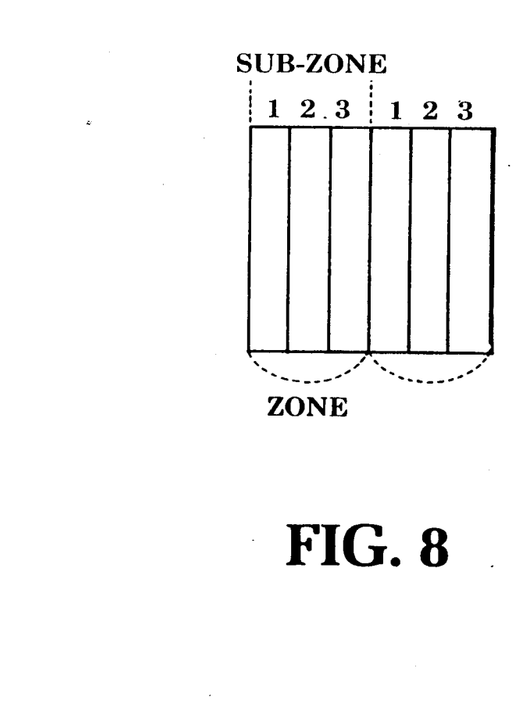

An embodiment suitable for use in the aforementioned applications is shown in FIGS. 7 and 8. In this embodiment, the system would require three x-ray heads mounted in an arc with three image receivers and intensifiers mounted in a similar, but opposite arc. Each x-ray head would be mounted 7° -10° from the centerline of the device with the image receivers being similarly situated. Each receiver could use a 3 to 1 grid having 3 subzones per lenticle as shown in FIG. 8. For medical purposes, the three x-ray heads could be fired desynchronously, but in sequence with one image being captured, for example, every one-third of a second. The resultant composite image would be seen as a three-dimensional frame and, since an after image could be incorporated into the screen, less radiation to the patient would result. It is to be understood that a greater number of frames per second would produce a "crisper" and higher quality image.

Figure 9:
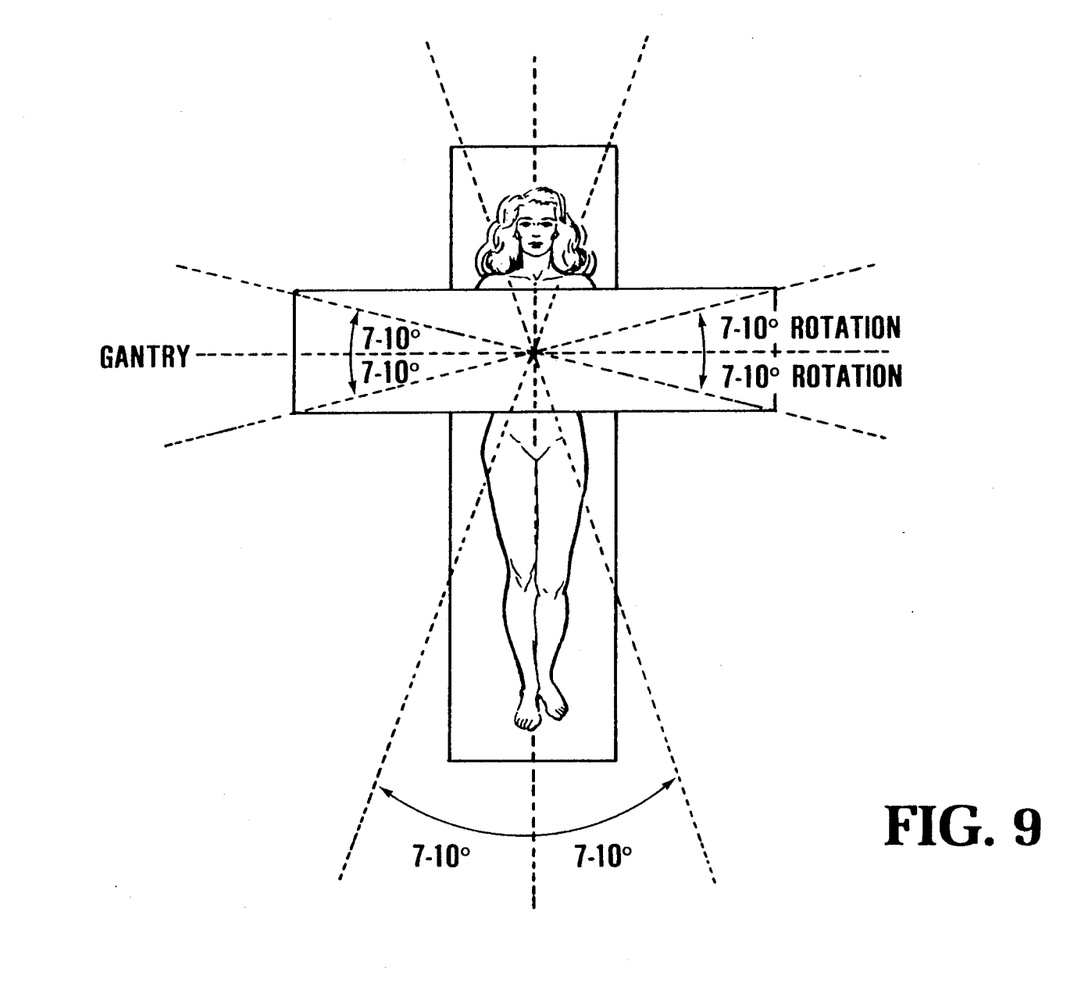
FIG. 9 illustrates use of the instant invention with CAT scan and MRI scan equipment.

FIG. 9 illustrates an embodiment for use in MRI or CAT scans. In this embodiment, it would be necessary to rotate either the gantry or the patient in 3 to 10 passes over a region of interest in order to produce a three-dimensional image. As indicated, the amount of rotation would be 7°–10° about the centerline.

The image receiver to be utilized with the instant invention can be a standard television receiver having a lenticular lens affixed to the front thereof. It would be necessary for the lenticular lens to incorporate an aligning micrometer so that the lens could be properly synchronized with the incoming signal. Similarly, if the receiver was a high resolution television receiver, a lenticular lens would also have to be attached to the front thereof.

An alternate arrangement would be to incorporate a lenticular lens into the outer surface of the t.v. tube. It is, of course, understood that the lenticular lens on the receiver must match the same grid and the lenticular lens array from which it (the grid) was manufactured initially, prior to the image being transmitted to the system receiver. For large screen three-dimensional viewing, the receiving screen would require rear projection. As with conventional t.v., a lenticular lens would be required to extend over the width of the screen. Such a large lens could be constructed of extruded polyvinyl or other adaptable clear plastic, formable into perfect tubes which would be semi-circular with one side having a flat surface.

The lenticulars on the lenticular lens could be sealed at the lower end thereof and filled with water. After the screen is used, the water could be removed for transportation. Such tubes would have to be sealed at the ends thereof to prevent foreign material being incorporated into the liquid medium. Another alternative for screen construction could be a large corrugated cardboard like sheet made of clear plastic, which could be heat sealed at the bottom and filled with foam from the top. The rear flat surface would be opaque, again producing a portable and inexpensive screen.

It would also be possible to receive a two-dimensional image on such a receiver adaptable for three-dimensional viewing. One example would be to make the lenticular lens removable for any particular viewing sequence. Alternatively, a negative or female lenticular lens could be applied over the existing lenticular lens to convert the image from three-dimensional to two-dimensional, which negative grid would be removed for three-dimensional viewing.

In accordance with the invention, it is also desirable to propose a preferred method of grid fabrication which provides: (1) a high degree of accuracy; (2) precise matching of the optical grid and lenticular viewing screen; (3) slight variation in pitch between the optical grid and lenticular viewing screen to permit proper perspective at pre-selected viewing distances; and (4) the exact ratio of opaque and clear strips, determined by the number of different pictures (or equivalent) to be taken. The procedure for fabrication of the grid in accordance with this invention is as follows:

In order to obtain the desirable degree of accuracy, and a perfect matching of the grid with the lenticular screen which will be used for viewing, (even if distortions exist in the lenticular screen) the grid has to be made from the said lenticular screen. A film is placed in a holder behind the lenticular screen, in close contact with it, and is illuminated by a light source, the characteristics of which are determined by the desired ratio of opaque and clear strips. In all cases, the light will be a line, or a slit, perpendicular to the lenticules of the screen.

The width of the slit is determined by the desired ratio of the grid, i.e., the number of different pictures of the same rotating subject which have to be recorded on the same film. If the acceptance angle of the lenticular plate is a and the number of pictures N, the width of the slit will be such that it covers an angle $X = a/N$.

The distance between the light source and the film is determined by the desired viewing distance from which the film will be examined. At that distance, one eye of the observer must be able to see one complete set of line images corresponding to one position of the subject. The grid, therefore, must present one clear line for each lenticule of the lenticular plate. In other words, the grid has to be the projection on the focal plane of the lenticular plate, of the optical axes of the lenticules it is composed of, the origin of the projection being situated at the desired minimum viewing distance. Because both eyes are used in 3D vision, the minimum viewing distance is the distance from which one eye sees the base of the lenticular plate (this being the width of the lenticular plate in the direction perpendicular to the lenticules), plus the inter-pupillary distance, under an angle equal to the acceptance angle of the lenticular plate. Obviously, that distance is the one at which the light source has to be from the lenticular plate when making the grid. After processing, the master, or a positive copy of the master, is mounted in a cassette or film holder, its emulsion facing the emulsion of the unexposed film, with the base portion being placed against the intensifying screen. Thus, any minute defect in the arrangement of the lenticules is reproduced on the 3D film taken through the grid, and the matching is perfect.

It is an important aspect of the instant invention that it is adaptable for use with existing television receivers. For example, assuming a series of nine cameras, it is possible that camera number 5, in the center of the recording group of cameras, would transmit only a two-dimensional image. The remaining cameras would create a three-dimensional image in the manner described above. These images could be transmitted at alternate sequences electronically, such that a standard television receiver would receive only the two-dimensional image, while an appropriate receiver designed for use with the invention would receive and display a three-dimensional image. Various well known electronic devices are capable of transmitting such alternative information sequences.

A still further use of the instant invention is the possibility that three simultaneous channels could be displayed on the same viewing screen. For example, assuming a transmission of nine sub-zones of information, a viewer present in the center of the screen properly positioned would view sub-zones 4, 5 and 6 of the image, while a viewer to the left of the screen would view sub-zones 1, 2 and 3, and a person to the right of the screen would view sub-zones 7, 8 and 9. If the viewers were properly positioned and the images properly selected for three simultaneous channels, each viewer could respectfully view a different image presentation. It is, of course, understood that headphones or other means would be necessary to separate the audio portion of the three simultaneous displays.

The instant invention accomplishes three-dimensional/four-dimensional imaging to enhance the viewing of any optical image. It can be used in conjunction with television, movies, robotics, security systems, video games, video discs, x-rays, CAT scans, MRI scans and computer displays. If moving three-dimensional pictures are recorded and displayed in an appropriate time sequence, it is possible to produce three-dimensional/four-dimensional movie displays. All images captured in accordance with the instant invention can be transmitted on conventional transmission equipment and received on ordinary television screens provided with a lenticular lens in the manner described above. The invention can also be used for aircraft and border surveillance for the scanning of closed containers in order to enhance airport security, detect the interstate or international transmission of hazardous goods, and so forth.

Although a specific embodiment of this invention has been shown and described, it will be understood that various modifications may be made without departing from the spirit of the invention.

I claim:

1. An apparatus for creating multi-dimensional images comprising:
   (a) a plurality of image capture devices arranged in a predetermined pattern about a target image;
   (b) a first lenticular device located at a first predetermined position between said image capture devices and said target image;
   (c) means for displaying images captured by said image capture devices; and
   (d) a second lenticular device located at a second predetermined position adjacent to said displaying means, said first and second lenticular devices being identical in shape and optical characteristics.

2. Apparatus in accordance with claim 1, wherein said first lenticular device divides said target image into a plurality of equally sized strip images, each strip image being comprised of a select view of said target image from a different viewing angle.

3. Apparatus in accordance with claim 2, wherein said second lenticular device is attached to a viewing screen of said displaying means.

4. A method for creating a multi-dimensional image comprising the steps of:
   (a) arranging a plurality of image capture devices in a predetermined pattern about a target image;
   (b) locating a first lenticular device at a first predetermined position between said image capture device and said target image;
   (c) displaying the image captured by said image capture devices; and
   (d) locating a second lenticular device at a second predetermined location adjacent to a screen upon which said image is displayed, said first and second lenticular devices being identical in shape and optical characteristics.

5. A method for creating a multi-dimensional image comprising the steps of:
   (a) arranging a plurality of image capture devices in a predetermined pattern about a target image;
   (b) locating a first lenticular device at a first predetermined position between said image capture devices and said target image so as to divide said target image into a plurality of equal strip images;
   (c) screening the strip images formed by blocking a predetermined number of said strip images from said image capture devices and permitting a predetermined one of said strip images to reach said imaging capture devices;
   (d) displaying the images captured by said image capture devices on a viewing screen; and
   (e) locating a second lenticular device at a second predetermined location adjacent to the screen upon which said images are displayed.

6. An apparatus for creating multi-dimensional images comprising:
   (a) a plurality of image capture devices arranged in a predetermined pattern about a target image, said image capture devices including means for storing predetermined strip images as a composite image in an image storage device;
   (b) a first lenticular device located at a first predetermined position between said image capture devices and said target image which divides said target image into a plurality of equally sized strip images, each strip image being comprised of a select view of said target image from a different viewing angle;
   (c) means for displaying images captured by said image capture devices on a viewing screen; and
   (d) a second lenticular device located at a second predetermined position adjacent to said displaying means, said second lenticular device being attached to the viewing screen of said displaying means.

7. An apparatus of claim 6, wherein there is further included means for transmitting said stored composite image into said displaying means.

8. An apparatus of claim 7, wherein said displaying means includes a standard television receiver having said second lenticular device mounted immediately adjacent to the screen of the television receiver.

9. An apparatus of claim 8, wherein said second lenticular device is transversely movable in relation to the screen of the television receiver.

10. An apparatus of claim 6, wherein said image storage device is film.

* * * * *